United States Patent [19]

van Diest et al.

[11] 4,452,606

[45] Jun. 5, 1984

[54] COMPOSITIONS USEFUL FOR IMPROVING THE FASTNESS OF DYEINGS ON CELLULOSIC SUBSTRATES: PRECONDENSATES OF N-METHYLOL COMPOUND WITH POLYALKYLENE POLYAMINE-EPIHALOHYDRIN PRODUCT

[75] Inventors: Joseph van Diest; Salvatore Valenti, both of Binningen, Switzerland

[73] Assignee: Sandoz Ltd., Basel, Switzerland

[21] Appl. No.: 376,900

[22] Filed: May 10, 1982

[30] Foreign Application Priority Data

May 14, 1981 [DE] Fed. Rep. of Germany ....... 3119114
Jun. 15, 1981 [DE] Fed. Rep. of Germany ....... 3123663

[51] Int. Cl.$^3$ .......................... C08G 12/40; D06P 5/02
[52] U.S. Cl. .......................................... 8/496; 8/551; 8/585; 8/918; 528/250; 528/261; 528/262; 528/263
[58] Field of Search .......................... 8/496, 551, 585; 528/250, 261

[56] References Cited

U.S. PATENT DOCUMENTS

| | | | |
|---|---|---|---|
| 2,595,935 | 5/1952 | Daniel et al. | 528/424 |
| 2,649,354 | 8/1953 | Hemmi et al. | 8/551 |
| 2,699,435 | 1/1955 | Auten et al. | 260/69 |
| 2,769,797 | 11/1956 | Suen et al. | 260/45.2 |
| 3,141,728 | 7/1964 | Bockmann et al. | 8/551 |
| 3,544,363 | 12/1970 | Rath et al. | 8/602 |
| 3,594,272 | 7/1971 | Shen et al. | 162/167 |
| 3,763,106 | 10/1973 | Markiewitz | 8/185 |
| 3,839,291 | 10/1974 | Avis | 528/250 |
| 4,210,415 | 7/1980 | Pardo et al. | 8/128 A |
| 4,240,935 | 12/1980 | Dumas | 524/72 |

FOREIGN PATENT DOCUMENTS

| | | |
|---|---|---|
| 55-30450 | 3/1980 | Japan . |
| 57-106783 | 7/1982 | Japan . |
| 898298 | 6/1962 | United Kingdom . |
| 912902 | 12/1962 | United Kingdom . |
| 952680 | 3/1964 | United Kingdom . |
| 1114036 | 5/1968 | United Kingdom . |
| 1396195 | 6/1975 | United Kingdom . |
| 1489588 | 10/1977 | United Kingdom . |
| 2006279 | 5/1979 | United Kingdom . |
| 2070006 | 9/1981 | United Kingdom . |
| 2084597 | 4/1982 | United Kingdom . |
| 2098620 | 11/1982 | United Kingdom . |

*Primary Examiner*—A. Lionel Clingman
*Attorney, Agent, or Firm*—Gerald D. Sharkin; Richard E. Vila; Thomas C. Doyle

[57] ABSTRACT

The wet fastness properties of direct or reactive dyeings on cellulosic substrates are improved by aftertreatment with a precondensate or mixture of (A) the product of reacting a polyalkylenepolyamine in free base or salt form with an epihalohydrin or a precursor thereof and (B) and N-methylol derivative of a urea, melamine, guanamine, triazinone, urone, carbamate or acid amide in the presence of (C) a catalyst for the cross-linking of N-methylol compounds of the type (B) above, followed by a heat-curing step.

29 Claims, No Drawings

COMPOSITIONS USEFUL FOR IMPROVING THE FASTNESS OF DYEINGS ON CELLULOSIC SUBSTRATES: PRECONDENSATES OF N-METHYLOL COMPOUND WITH POLYALKYLENE POLYAMINE-EPIHALOHYDRIN PRODUCT

This invention relates to an aftertreatment process for improving the fastness properties of dyes and optical brighteners on a hydroxy group-containing substrate.

The invention provides a process for improving the fastness properties of a dyestuff or optical brightener on a substrate comprising hydroxy group-containing fibres by applying to the dyed, printed or brightened substrate either a precondensate or a mixture of (A) the product of reacting a polyalkylenepolyamine in free base or salt form with an epihalohydrin or a precursor thereof and (B) an N-methylol derivative of a urea, melamine, quanamine, triazinone, urone, carbamate or acid amide in the presence of (C) a catalyst for the cross-linking of N-methylol compounds of the type (B) above, and subsequently carrying out a heat-curing step.

The invention further provides, as a new composition of matter, the precondensate of components (A) and (B) above.

The polyalkylenepolyamine starting material for component (A) may contain primary, secondary or tertiary amine groups, or any combination of these, but preferably has two primary amino groups. Preferred polyalkylenepolyamines are of formula I

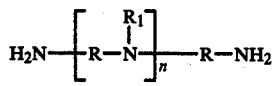

in which

R is $C_{2-4}$alkylene $R_1$ is hydrogen; phenyl; unsubstituted $C_{1-4}$alkyl; or $C_{1-4}$alkyl substituted by one —OH, —OR$_2$, halogen or phenyl, where $R_2$ is a $C_{1-4}$alkyl group, and n is an integer from 1 to 5.

Where R or $R_1$ occur more than once in the molecule, they may have the same or different significances.

Particularly preferred polyalkylenepolyamines of formula I are diethylene triamine, triethylene tetramine, tetraethylene pentamine, 2-aminoethyl-3-aminopropylamine, dipropylene triamine and N,N-bis-(3-aminopropyl)methylamine.

The epihalohydrin starting material for component (A) is preferably epichlorohydrin, but a precursor of epichlorohydrin, for example dichlorohydrin (ClCH$_2$.CHOH.CH$_2$Cl) may also be used. Component (A) is preferably obtained by reaction of epichlorohydrin with one of the above-named polyalkylenepolyamines, particularly with dipropylene triamine or N,N-bis-(3-amino-propyl)methylamine. Suitably, 1 mole of polyalkylenepolyamine is reacted with from 1 to (q+r) moles of epihalohydrin or precursor, where q is a number equal to the number of hydrogen atoms attached to nitrogen in the molecule of polyalkylenepolyamine and r is the number of primary plus secondary amino groups in the molecule. Preferably the number of moles of epihalohydrin is from 1 to q, more preferably r. The number r is preferably 3.

The resulting components (A) are water-soluble high molecular weight linear polybasic compounds, and have a molecular weight of from 1000 to 30,000, depending upon the condensation time and reaction conditions. Thus for example the product of reacting dipropylene triamine or N,N,-bis-(3-amino-propyl)methylamine with epichlorohydrin in 1:3 mole ratio gives a linear polymer containing repeating units of formula II

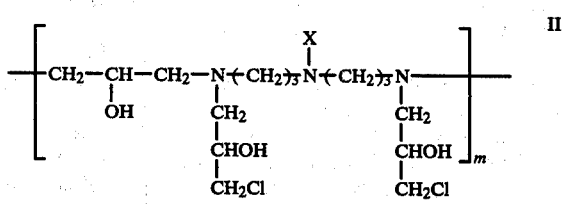

in which X is hydrogen or methyl and m is a number from 3 to 30.

Components (A) are known, for example from U.S. Pat. No. 2,595,935, and may be prepared by the methods described therein. Components (A) not specifically described may be prepared by analogous methods. Preferably reaction is carried out in alkaline to neutral medium and component (A) is obtained in salt form when the reaction is stopped by addition of acid. The anion is that derived from the epihalohydrin or from the acid which was used. The anions of the salt form of (A) may also be exchanged by known methods.

Components (B) are generally those N-methylol compounds which are known as crosslinking agents for cellulose fibres, and are used to impart a crease-resistant finish to cellulose fabrics. The compounds may contain free N-methylol groups >N—CH$_2$OH, or these may be etherified. Preferred ether derivatives are the lower alkyl ethers having 1 to 4 carbon atoms in the alkyl groups.

Examples of suitable N-methylol compounds are N-N'-dimethylolurea, N,N'-dimethylolurea dimethyl ether, N,N'-tetramethylolacetylenediurea, N,N'-dimethylolpropyleneurea, 4,5-dihydroxy-N,N'-dimethylolethyleneurea, 4,5-dihydroxy-N,N'-dimethylolethyleneurea dimethyl ether, N,N'-dimethylol-5-hydroxypropyleneurea, N,N'-dimethylol-4-methoxy-5,5-dimethylpropyleneurea, N,N'-dimethylolethyleneurea, methoxymethylmelamine, dimethylolalkandioldiurethanes, N,N'-dimethylol-5-alkylhexahydro-1,3,5-triazin-2-ones, N,N'-dimethylolurone and dimethylolcarbamates. These compounds can be used either alone or as mixtures.

Particularly suitable are hydrolysis-resistant reactive resin precursors, for example N,N'-dimethylol-4,5-dihydroxy- or 4,5-dimethoxy-ethyleneurea, N,N'-dimethylol-4-methoxy-5,5-dimethylpropyleneurea and N,N'-dimethylol carbamates, optionally in etherified form. Preferred ether forms are the methyl and ethyl ether derivatives.

Suitable catalysts (C) include the nitrates, sulphates, chlorides, tetrafluoroborates and dihydrogen orthophosphates of aluminium, magnesium and zinc as well as aluminium hydroxychloride, zirconyl oxychloride and mixtures of any of these. These catalysts may also be used in the form of mixtures with water soluble, inorganic salts, particularly with alkali metal sulphates or alkaline earth salts, preferably chlorides. Particularly preferred are sodium or potassium sulphate and calcium chloride. They may also be used in the form of mixtures with organic acids such as citric acid. Other suitable catalysts are (a) alkali metal bisulphites (b) amine hydrochlorides, for example 2-amino-2-methylpropanol hydrochloride (c) organic acids, for example citric, oxalic, maleic, glycollic and trichloracetic acids (d) inorganic acids, for example phosphoric and hydrochloric acids, alone or together with salts for example ammonium or calcium chloride, and (e) ammonium salts of inorganic acids, for example ammonium nitrate, chloride, sulphate and oxalate, and mono- and di-ammonium orthophosphate.

Mixtures of any of these catalysts may be used.

Preferred catalysts are the nitrates, sulphates, chlorides and dihydrogen orthophosphates of aluminium, magnesium or zinc, more preferably of magnesium, particularly magnesium chloride, optionally together with an alkali metal sulphate, particularly sodium sulphate. The choice of the optimum catalyst system will however depend primarily upon the nature of component (B), and of the textile substrate, and the man skilled in the art will be aware from numerous publications which catalyst systems are preferred for specific resin precursors and substrates.

The invention further provides an aftertreatment agent for a dyed, printed or brightened substrate comprising hydroxy group-containing fibres comprising a precondensate or a mixture of components (A) and (B) as defined above, and a catalyst (C) as defined above.

It is preferred that the aftertreatment agent contain (A) and (B) in the form of a precondensate; that is, as a reaction product which remains water-soluble and non-gelled, and is capable of further reaction with hydroxyl group-containing fibres on heat-curing. The precondensate may be prepared by reacting together (A) and (B) in aqueous medium, preferably with constant stirring, at temperatures from room temperature to 100° C., preferably 60°–100° C., more preferably 70°–80° C. and a pH of 3–6, preferably 4–5. The reaction is stopped before the reaction product becomes insoluble or forms a gel; suitable reaction times are of the order of 30 minutes to 3 hours. Preferably component (A) is added portionwise to stirred component (B) at 60°–100° C.

The reaction between (A) and (B) may take place in the presence of the catalyst (C); alternatively (C) may be added after (A) and (B) have been reacted together. When it is present during the reaction it is preferably dissolved in component (B) before (A) is added.

It is found that a more stable product is obtained if from 1% to 10% (by weight based on the total of (A)+(B)) of cyanamide or dicyandiamide (DCDA), preferably DCDA, is added to the reaction mixture, preferably before reaction takes place.

The relative amounts of components (A), (B) and (C) in the aftertreatment agent fall within the limits of 5–40 parts by weight (A), 25–110 parts by weight (B) and 1–30 parts by weight (C), calculated on the basis of the dry weight of active component present. Expressed as a weight ratio, the ratio of A:B:C is 1:0.625–22:0.025–6. Preferred ranges are 10–40 parts (A), 35–100 parts (B) and 5–15 parts (C) or A:B:C=1:0.875–10:0.125–1.5. Preferably the amount of (C) is 7.5–12.5% by weight of the dry weight of (B).

The hydroxy group-containing substrate is preferably a cellulosic fibrous substrate comprising natural or regenerated cellulose, particularly cotton and viscose rayon, alone or mixed with synthetic fibres. The substrate may be dyed, printed or brightened by any conventional methods, for example dyeing or brightening may be carried out by exhaust methods or by padding followed by thermofixation or cold dwell fixation or, in the case of reactive dyes, by alkaline fixation. The process according to the invention is particularly suitable for reactive and direct dyestuffs, of which metal complex direct dyestuffs, especially copper complex dyes, are preferred.

The process according to the invention is carried out upon a substrate on which the dyeing or printing process including any necessary fixation step, has been completed. The substrate may be dry, or may still be damp, provided that it is not so wet that it is incapable of further pick-up. The reaction product or mixture of (A) and (B), together with catalyst (C) is applied to the substrate in aqueous solution by dipping, spraying, foam application, padding or other conventional application techniques. The preferred application method is by padding at room temperature.

The quantities in which the product according to the invention is applied to the substrate depend largely upon the depth of the dyeing which is to be fixed. For direct dyeings of 1/1 standard depth on cotton the quantities used are 30–200 g/l of the padding liquor when applied at a pick-up of 70–100% of the dry weight of the goods. Preferably the quantity is 70–140 g/l for cotton, in order to obtain a wash-resistant improvement in wet fastness together with adequate crease resistance, and 100–200 g/l for regenerated cellulose. For application to mixtures of cellulose fibres and synthetic fibres, the quantity to be applied is calculated on the basis of the cellulose content of the substrate.

The padding liquor may contain further auxiliaries such as stiffening agents, softening agents, agents to improve the rubbing or breaking strength, soil-release products, hydrophobic agents and others provided that these are capable of forming stable aqueous solutions when mixed with the product according to the invention.

After application of the padding liquor, the substrate is subjected to a heat curing step such as is conventional for resin treatment based on compounds of type (B). The substrate may for example be dried at 70°–120° C. and finally cross-linked at a temperature of 130°–180° C. for 2 to 8 minutes, or alternatively simultaneously dried and cross-linked by heat treatment at 100°–200° C., preferably 140°–180° C. for 5 seconds to 8 minutes depending on the temperature. A preferred process involves heating the padded substrate to 170°–180° C. for 30 seconds to 1 minute.

Particularly suitable direct dyestuffs for use with the process of the invention are the following:

C.I. Direct Red 80, 83, 84, 92, 95, 207, 211, 218;
C.I. Direct Yellow 39, 50, 98, 106, 129;
C.I. Direct Violet 47, 66, 95;
C.I. Direct Blue 71, 77, 79, 80, 85, 90, 94, 98, 217, 251;
C.I. Direct Green 27, 31, 65, 67;
C.I. Direct Brown 103, 111, 113, 116, 220;
C.I. Direct Black 62, 117, 118;
and particularly suitable reactive dyes are
C.I. Reactive Violet 23,
C.I. Reactive Blue 23
and
C.I. Reactive Blue 79.

Dyeings and printings with direct dyestuffs often show inadequate wash fastness. The dyestuff which is bound to the surface of the cellulose fibres is largely removed from the fibers by repeated washings, and bleeding of the dyestuff into the wash liquid can cause partial readsorption onto undyed cellulose material.

There have been many attempts to overcome these disadvantages, for example by complexing on the fibre with metal salts, formation of the dyestuff on the fibre, treatment of the dyestuff and/or the fibre with formaldehyde, impregnation with artificial resins and aftertreatment with cationic auxiliaries. The use of cationic after-treatment auxiliaries has proved particularly effective.

The disadvantage of all previously used methods is that although improved fastness is indeed attained, the results are only temporary. Even in the case of cationic after-treatment, the auxiliary is removed from the fibres by repeated washings, particularly under alkaline conditions and at high temperatures such as 50°–100° C. The loss of the cationic auxiliary means that the dyeing loses its improved wet fastness again.

It was hoped to solve the wet fastness problem by the use of reactive dyes, which form a chemical bond to the fibre. However, a disadvantage of the use of reactive dyes is that although the dyestuff which is chemically bound to the fibre has excellent wash fastness, the goods must be washed thoroughly after dyeing in order to remove residual unfixed dyestuff, which has poor wash fastness.

Treatment of dyed cellulose substrates according to the invention gives improved wet fastness properties, particularly fastness to washing, including washing under alkaline conditions at temperatures of 40°–90° C., particularly at 60° C. and above. For example, repeated 30 minute 60° C. washings with a wash liquor containing 5 g/l soap and 2 g/l soda at a goods to liquor ratio of 1:50 are readily withstood.

In the case of dyeings with reactive dyes, the wash fastness of the unfixed dye may be raised to approximately the same level as that of the fixed dye, thereby eliminating the need to remove the unfixed dye.

At the same time a resin finish is imparted to the cellulose fibres which gives reduced swelling in aqueous or alkaline media and hence more rapid drying, improved dimensional stability and higher crease resistance.

The following Examples, in which all parts and percentages are by weight and all temperatures in degrees Centigrade, illustrate the invention.

EXAMPLE 1

(a) (i) 145 Parts N,N-bis-(3-aminopropyl)methylamine are dissolved in 700 parts water and treated over 30 minutes with 277 parts epichlorohydrin, with stirring and external cooling to hold the temperature at about 40°. Finally the mixture is stirred at 40° until its viscosity noticably increases (2–3 hours). This mixture is then cooled to room temperature and acidified with 105 parts 35% hydrochloric acid and 60 parts glacial acetic acid, under external cooling. A clear, colourless, viscous solution having a solids content of approx. 40% by weight is obtained.

(ii) 150 Parts of this solution is added together with 7.5 parts dicyandiamide to 150 parts of a 50% aqueous solution of N,N'-dimethyloldihydroxyethyleneurea, and the mixture stirred until homogeneous. The mixture is stirred at 70°–80° for 1½ hours, to give a homogeneous solution having a viscosity of 30 cp (Brookfield viscometer) at 20°. After addition of 22 parts MgCl$_2$.6H$_2$O, the product can be used as an aftertreatment agent for dyeings on cotton.

(b) Alternatively, 22 parts MgCl$_2$.6H$_2$O is dissolved in the dimethyloldihydroxyethyleneurea solution before the amine/epichlorohydrin product and DCDA are added, and reaction is carried out as in (a)(ii) above.

(c) As a further alternative, 150 parts of the reaction product of (a)(i) above, 150 parts of a 50% aqueous solution of N,N'-dimethyloldihydroxyethyleneurea and 22 parts MgCl$_2$.6H$_2$O are stirred together at room temperature until a homogeneous solution is obtained.

The products of (b) and (c) above can also be used as aftertreatment agents for dyeing on cotton.

EXAMPLE 2

92 Parts dichlorohydrin are added over 30 minutes to a solution of 46 parts dipropylene triamine and 210 parts water at 55°. The solution is stirred at this temperature for 6 hours, then acidified with 70 parts concentrated hydrochloric acid.

75 Parts of the solution so obtained are stirred with 390 parts of 50% aqueous solution of N,N'-dimethyloldihydroxyethyleneurea until the mixture is homogeneous. The temperature is raised to 70° over 10 minutes and reaction continued for 30 minutes. A water-soluble precondensate is formed which after addition of 80 parts MgCl$_2$.6H$_2$O can be used as an after-treatment agent for dyeings on cotton.

EXAMPLES 3, 4

The processes of Example 1 may be carried out using the following quantities of reagents (parts by weight)

|  | Example 3 | Example 4 |
|---|---|---|
| Epichlorohydrin | 92 | 92 |
| Diethylenetriamine | 36 | — |
| 2-aminoethyl-3-aminopropylamine | — | 41 |
| N,N'—dimethyloldihydroxyethyleneurea (50%) | 390 | 390 |
| MgCl$_2$.6H$_2$O | 80 | 80 |

EXAMPLE 5

A cotton fabric dyed with a 1/1 standard depth dyeing of the dyestuff C.I. Direct Blue 90 is padded with an aqueous solution containing 200 g/l of the product of Example 1a and squeezed out to give a pick-up of about 80%. The fabric is then shock-dried on a tension frame at 175°–180° in such a way that the crosslinking time of the dry fabric is 30–45 seconds at this temperature.

The fixed dyeing exhibits excellent wash-fastness, and withstands repeated 60° washes and even a wash at the boil. At the same time a clear improvement of crease resistance is obtained, and the swelling value of the cellulose fibres is reduced.

Comparable results are obtained using the products of Examples 1b, 1c and 2–4.

What is claimed is:

1. A process for improving the fastness properties of a dyestuff or optical brightener on a substrate comprising hydroxy group-containing fibres which process comprises applying to the substrate dyed or printed with said dyestuff or brightened with said optical brightener either a precondensate or a mixture of
   (A) the product of reacting a polyalkylenepolyamine in free base or salt form with an epihalohydrin or epihalohydrin precursor and
(B) an N-methylol derivative of a urea, melamine, guanamine, triazinone, urone, carbamate or acid amide in the presence of
(C) a catalyst suitable for the cross-linking of N-methylol compound (B)
and subsequently heat-curing the thus-treated substrate.

2. A process according to claim 1 wherein component (A) is the product of reacting a polyalkylenepolyamine containing two primary amino groups with an epihalohydrin or an epihalohydrin precursor.

3. A process according to claim 2 wherein component (A) is produced from a polyalkylenepolyamine of formula I

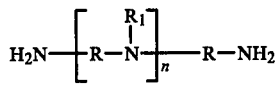
I in which
each R, independently, is $C_{2-4}$alkylene
each $R_1$, independently, is hydrogen; phenyl; unsubstituted $C_{1-4}$alkyl; or $C_{1-4}$alkyl substituted by one —OH, —$OR_2$, halogen or phenyl, where $R_2$ is $C_{1-4}$alkyl group,
and n is an integer from 1 to 5.

4. A process according to claim 2 wherein component (B) contains N-methylol groups which are in free form or etherified with $C_{1-4}$alkyl groups.

5. A process according to claim 3 wherein component (A) is the reaction product of a polyalkylenepolyamine of formula I and epichlorohydrin or dichlorohydrin.

6. A process according to claim 3 wherein component (B) is selected from the group consisting of N,N'-dimethylolurea, N,N'-tetramethylolacetylenediurea, N,N'-dimethylolpropyleneurea, 4,5-dihydroxy-N,N'-dimethylolethyleneurea, 4,5-dimethoxy-N,N'-dimethylolethyleneurea, N,N'-demethylol-5-hydroxypropyleneurea, N,N'-dimethylol-4-methoxy-5,5-dimethylpropyleneurea, N,N'-dimethylolethyleneurea, methoxymethylmelamine, dimethylolalkandioldiurethanes, N,N'-dimethylol-5-alkylhexahydro-1,3,5-triazin-2-ones, N,N'-dimethylolurone and dimethylolcarbamates, wherein the N-methylol groups are in their free form or in the form of methyl or ethyl ethers.

7. A process according to claim 6 wherein the catalyst (C) is selected from the nitrates, sulphates, chlorides, tetrafluoroborates and dihydrogen orthophosphates of aluminium, magnesium and zinc; aluminium hydroxychloride; zirconyl oxychloride; alkali metal bisulphites; 2-amino-2-methylpropanol hydrochloride; citric, oxalic, maleic, glycollic and trichloracetic acids; phosphoric and hydrochloric acids; ammonium nitrate, chloride, sulphate and oxalate; mono- and di-ammonium orthophosphate; and mixtures thereof.

8. A process according to claim 7 wherein the substrate is a cellulosic fibrous substrate dyed with a reactive or direct dyestuff, component (B) is selected from the group consisting of N,N'-dimethylol-4,5-dihydroxyethyleneurea, N,N'-dimethylol-4,5-dimethoxyethyleneurea, N,N'-dimethylol-4-methoxy-5,5-dimethylpropyleneurea, N,N'-dimethylol carbamates and the methyl and ethyl ethers of said compounds, and the precondensate of (A) and (B) is one prepared by reacting (A) and (B) at a temperature from room temperature to 100° C.

9. A precondensate obtained by reacting together
(A) the product of reacting a polyalkylenepolyamine in free base or salt form with an epihalohydrin or epihalohydrin precursor
and
(B) N,N'-dimethylol-4,5-dihydroxyethyleneurea, N,N'-dimethylol-4,5-dimethoxyethyleneurea, N,N'-dimethylol-4-methoxy-5,5-dimethylpropyleneurea, an N,N'-dimethylol carbamate, or a methyl or ethyl ether of said compounds.

10. A precondensate according to claim 9 in which the polyalkylenepolyamine starting material for component (A) is of formula I

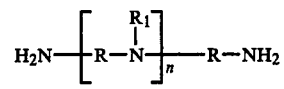
I in which
each R independently is $C_{2-4}$alkylene,
each $R_1$ independently is hydrogen; phenyl; unsubstituted $C_{2-4}$alkyl; or $C_{1-4}$alkyl substituted by one —OH, —$OR_2$, halogen or phenyl, where $R_2$ is a $C_{1-4}$alkyl group,
and n is an integer from 1 to 5.

11. A precondensate according to claim 9 in which component (B) is N,N'-dimethylol-4,5-dihydroxyethyleneurea.

12. A precondensate according to claim 9 wherein component (A) is the product of reacting a polyalkylenepolyamine containing two primary amino groups with an epihalohydrin or an epihalohydrin precursor.

13. A precondensate according to claim 10 in which component (A) is a linear polymer containing repeating units of formula II

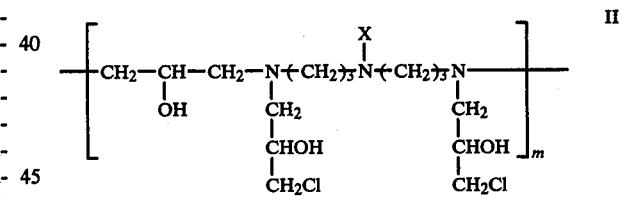
II in which X is hydrogen or methyl and m is a number from 3 to 30.

14. A precondensate according to claim 10 wherein component (A) is the reaction product of a polyalkylenepolyamine of formula I and epichlorohydrin or dichlorohydrin.

15. A precondensate according to claim 13 wherein component (B) is N,N'-dimethylol-4,5-dihydroxyethyleneurea.

16. A precondensate according to claim 13 obtained by reacting (A) and (B) at a temperature from room temperature to 100° C.

17. A precondensate according to claim 14 which is water soluble and is produced from a water soluble component (A) having a molecular weight of 1,000 to 30,000 and obtained by reacting 1 to (q+r) mols of epichlorohydrin or dichlorohydrin per mol of polyalkylenepolyamine, where q is the number of hydrogen atoms attached to nitrogen in the polyalkylenepolyamine and r is the number of primary plus secondary amino groups in the polyalkylenepolyamine.

18. An aftertreatment agent for a dyed, printed or brightened substrate comprising hydroxy-group-containing fibers, said agent comprising a mixture of
(C) a catalyst suitable for the cross-linking of N-methylol compound (B)
and a precondensate obtained by reacting
(A) the product of reacting a polyalkylenepolyamine in free base or salt form with an epihalohydrin or epihalohydrin precursor
with (B) an N-methylol derivative of a urea, melamine, guanamine, triazinone, urone, carbamate or acid amide.

19. An aftertreatment agent according to claim 18 wherein the precondensate is obtained by reacting (A) and (B) in the presence of (C).

20. An aftertreatment agent for a dyed, printed or brightened substrate comprising hydroxy-group-containing fibers, said agent comprising a mixture of
(A) the product of reacting a polyalkylenepolyamine in free base or salt form with an epihalohydrin or epihalohydrin precursor,
(B) an N-methylol derivative of a urea, melamine, guanamine, triazinone, urone, carbamate or acid amide,
and (C) a catalyst suitable for the cross-linking of N-methylol compound (B).

21. An aftertreatment agent according to claim 18 wherein
(A) is a linear polymer containing repeating units of formula II

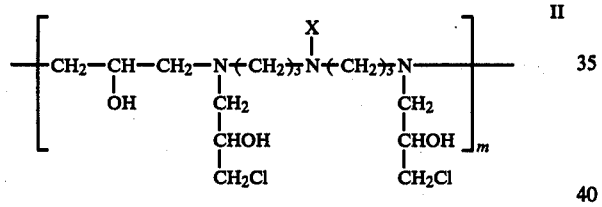

in which X is hydrogen or methyl and M is a number from 3 to 30,
(B) is selected from the group consisting of N,N'-dimethylolurea, N,N'-tetramethylolacetylenediurea, N,N'-dimethylolpropyleneurea, 4,5-dihydroxy-N,N'-dimethylolethyleneurea, 4,5-dimethoxy-N,N'-dimethylolethyleneurea, N,N-dimethylol-5-hydroxypropyleneurea, N,N'-dimethylol-4-methoxy-5,5-dimethylpropyleneurea, N,N'-dimethylolethyleneurea, methoxymethylmelamine, dimethylolalkandioldiurethanes, N,N'-dimethylol-5-alkylhexahydro-1,3,5-triazin-2-ones, N,N'-dimethylurone and dimethylolcarbamates, wherein the N-methylol groups are in their free form or in the form of methyl or ethyl ethers, and
(C) is selected from the nitrates, sulphates, chlorides, tetrafluoroborates and dihydrogen orthophosphates of aluminium, magnesium and zinc; aluminium hydroxychloride; zirconyl oxychloride; alkali metal bisulphites; 2-amino-2-methylpropanol hydrochloride; citric, oxalic, maleic, glycollic and trichloracetic acids; phosphoric and hydrochloric acids; ammonium nitrate, chloride, sulphate and oxalate; mono- and di-ammonium orthophosphate; and mixtures thereof.

22. An aftertreatment agent according to claim 19 wherein
(A) is a linear polymer containing repeating units of formula II

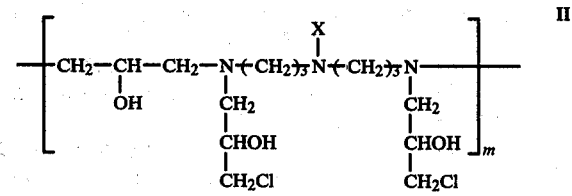

in which X is hydrogen or methyl and M is a number from 3 to 30,
(B) is selected from the group consisting of N,N'-dimethylolurea, N,N'-tetramethylolacetylenediurea, N,N'-dimethylolpropyleneurea, 4,5-dihydroxy-N,N'-dimethylolethyleneurea, 4,5-dimethoxy-N,N'-dimethylolethyleneurea, N,N-dimethylol-5-hydroxypropyleneurea, N,N'-dimethylol-4-methoxy-5,5-dimethylpropyleneurea, N,N'-dimethylolethyleneurea, methoxymethylmelamine, dimethylolalkandioldiurethanes, N,N'-dimethylol-5-alkylhexahydro-1,3,5-triazin-2-ones, N,N'-dimethylurone and dimethylolcarbamates, wherein the N-methylol groups are in their free form or in the form of methyl or ethyl ethers, and
(C) is selected from the nitrates, sulphates, chlorides, tetrafluoroborates and dihydrogen orthophosphates of aluminium, magnesium and zinc; aluminium hydroxychloride; zirconyl oxychloride; alkali metal bisulphites; 2-amino-2-methylpropanol hydrochloride; citric, oxalic, maleic, glycollic and trichloracetic acids; phosphoric and hydrochloric acids; ammonium nitrate, chloride, sulphate and oxalate; mono- and di-ammonium orthophosphate; and mixtures thereof.

23. An aftertreatment agent according to claim 20 wherein
(A) is a linear polymer containing repeating units of formula II

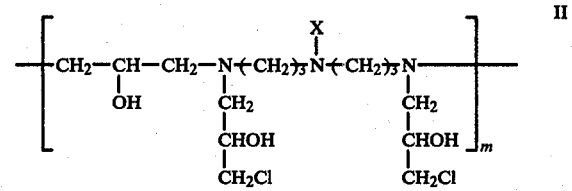

in which X is hydrogen or methyl and M is a number from 3 to 30,
(B) is selected from the group consisting of N,N'-dimethylolurea, N,N'-tetramethylolacetylenediurea, N,N'-dimethylolpropyleneurea, 4,5-dihydroxy-N,N'-dimethylolethyleneurea, 4,5-dimethoxy-N,N'-dimethylolethyleneurea, N,N-dimethylol-5-hydroxypropyleneurea, N,N'-dimethylol-4-methoxy-5,5-dimethylpropyleneurea, N,N'-dimethylolethyleneurea, methoxymethylmelamine, dimethylolalkandioldiurethanes, N,N'-dimethylol-5-alkylhexahydro-1,3,5-triazin-2-ones, N,N'-dimethylurone and dimethylolcarbamates, wherein the N-methylol groups are in their free form or in the form of methyl or ethyl ethers, and
(C) is selected from the nitrates, sulphates, chlorides, tetrafluoroborates and dihydrogen orthophosphates of aluminium, magnesium and zinc; aluminium hydroxychloride; zirconyl oxychloride; alkali metal bisulphites; 2-amino-2-methylpropanol hydrochloride; citric, oxalic, maleic, glycollic and trichloracetic acids; phosphoric and hydrochloric acids; ammonium nitrate, chloride, sulphate and oxalate; mono- and di-ammonium orthophosphate; and mixtures thereof.

24. An aftertreatment agent according to claim 22 prepared by reacting components (A) and (B) in the presence of catalyst (C) in a weight ratio A:B:C of 1:0.625–22:1.025–6.

25. An aftertreatment agent according to claim 21 prepared from components (A), (B) and (C) in a weight ratio of 1:0.625–22:0.025–6.

26. An aftertreatment agent according to claim 23 wherein components (A), (B) and (C) are present in a weight ratio A:B:C of 1:0.625–22:0.025–6.

27. An aftertreatment agent according to claim 24 wherein component (B) is selected from the group consisting of N,N'-dimethylol-4,5-dihydroxyethyleneurea, N,N'-dimethylol-4,5-dimethoxyethyleneurea, N,N'-dimethylol-4-methoxy-B  5,5-dimethylpropyleneurea, N,N'-dimethylol carbamates and the methyl and ethyl ethers of said compounds.

28. A precondensate according to claim 12 wherein component (A) is the product of reacting 1 mole of N,N'-bis-(3-aminopropyl)-methylamine with 3 moles of epichlorohydrin, and component (B) is N,N'-dimethylol-4,5-dihydroxyethyleneurea.

29. An aftertreatment agent according to claim 24 wherein (A) is a linear polymer containing repeating units of formula

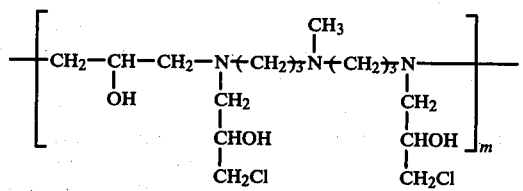

in which m is a number from 3 to 30, (B) is N,N'-dimethylol-4,5-dihydroxyethyleneurea and (C) is magnesium chloride.

* * * * *